(12) United States Patent
Kloiber et al.

(10) Patent No.: US 7,824,101 B2
(45) Date of Patent: Nov. 2, 2010

(54) SENSOR ARRANGEMENT

(75) Inventors: Gerald Kloiber, Feldkirchen (AT); Heinz Strallhofer, Deutschlandsberg (AT); Ralf Thomas Mayer, Aalen (DE)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 12/323,061

(22) Filed: Nov. 25, 2008

(65) Prior Publication Data

US 2009/0135882 A1 May 28, 2009

Related U.S. Application Data

(63) Continuation of application No. PCT/DE2007/000899, filed on May 15, 2007.

(30) Foreign Application Priority Data

May 30, 2006 (DE) .................. 10 2006 025 179

(51) Int. Cl.
*G01K 1/00* (2006.01)

(52) U.S. Cl. .................. 374/147; 374/208; 374/163

(58) Field of Classification Search ................. 374/208, 374/147, 163
See application file for complete search history.

(56) References Cited

U.S. PATENT DOCUMENTS

| 3,022,478 | A | * | 2/1962 | Fish | 338/31 |
| 3,874,239 | A | | 4/1975 | Finney | |
| 4,971,452 | A | * | 11/1990 | Finney | 374/208 |
| 5,993,061 | A | * | 11/1999 | Drouet | 374/208 |
| 6,546,823 | B1 | | 4/2003 | Veit | |
| 7,075,089 | B2 | | 7/2006 | Pohan | |
| 2001/0053172 | A1 | | 12/2001 | Sakowsky et al. | |
| 2002/0041621 | A1 | * | 4/2002 | Faries et al. | 374/147 |
| 2004/0190590 | A1 | * | 9/2004 | Wienand et al. | 374/147 |
| 2008/0056331 | A1 | | 3/2008 | Matias et al. | |

FOREIGN PATENT DOCUMENTS

| DE | 83 29 408.2 | 12/1984 |
| DE | 93 05 896.9 | 7/1993 |
| DE | 299 05 700 U1 | 6/1999 |
| DE | 100 29 186 A1 | 1/2002 |
| DE | 202 08 698 U1 | 9/2002 |
| DE | 102 50 196 A1 | 5/2004 |
| DE | 103 58 778 A1 | 7/2004 |
| DE | 10 2004 010 713 A1 | 9/2005 |
| DE | 10 2004 047 725 A1 | 4/2006 |
| GB | 2 164 150 A | 3/1986 |
| WO | WO 99/40401 | 8/1999 |

OTHER PUBLICATIONS

EPCOS AG, "Konfektionierte Heißleiter NTC Probes, Product Profile," 2004, 2 pages.
General Electric, "NTC Thermistors: Type JC, Clip-On Pipe Sensor," Data Sheet D-JC-3, 2 pages.

* cited by examiner

*Primary Examiner*—Lisa M Caputo
*Assistant Examiner*—Mirellys Jagan
(74) *Attorney, Agent, or Firm*—Slater & Matsil, L.L.P.

(57) ABSTRACT

A sensor arrangement includes a tube, a measurement head and a holder. The measurement head includes a composite of at least two flexible plastic films and a sensing element arranged between the plastic films. The sensing element is electrically contacted via metallic conductor traces. The measurement head contacts a circumference of the tube and is arranged between the holder and the tube and is pressed by the holder onto the tube.

19 Claims, 2 Drawing Sheets

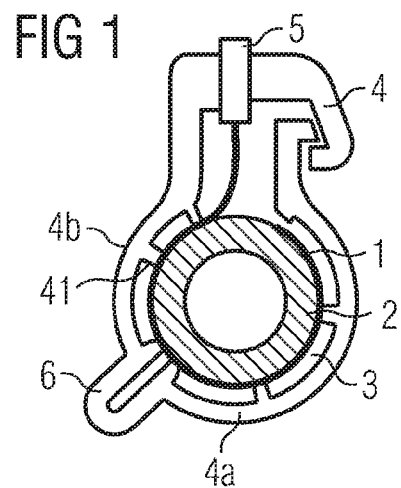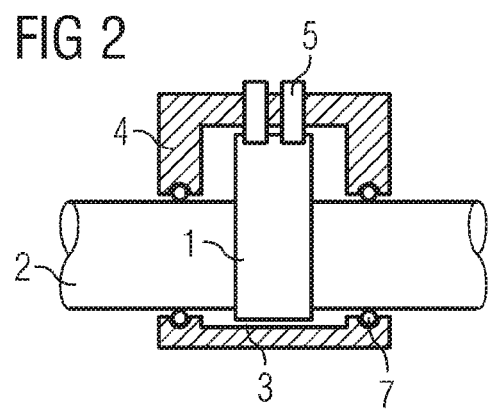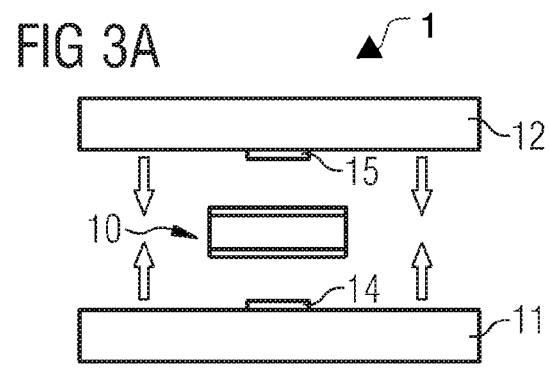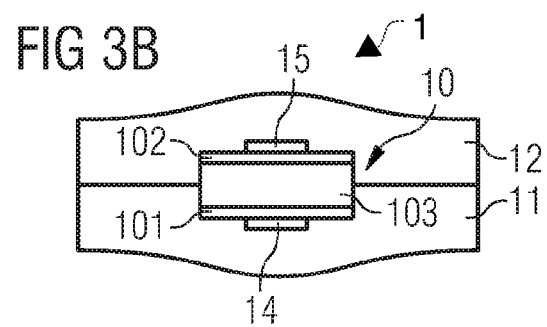

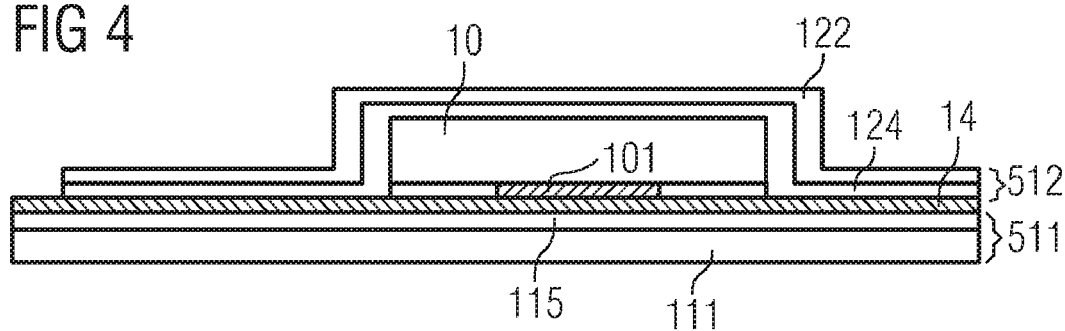
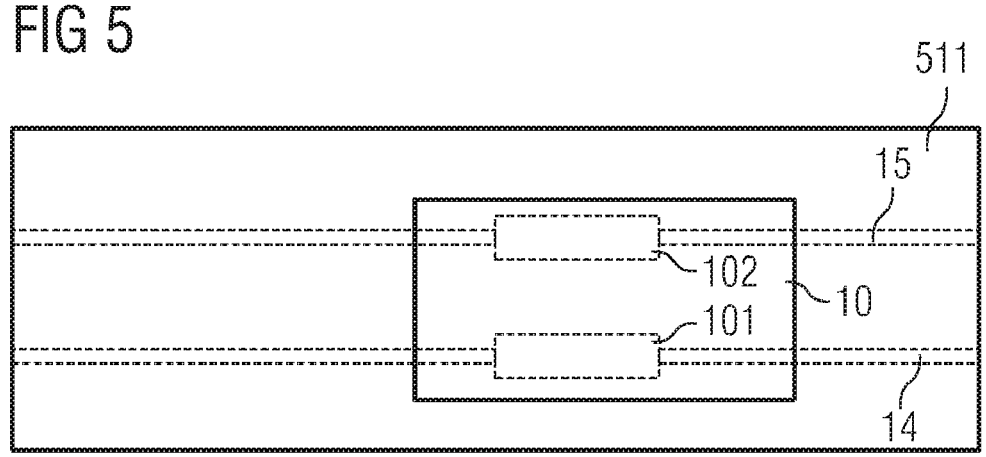
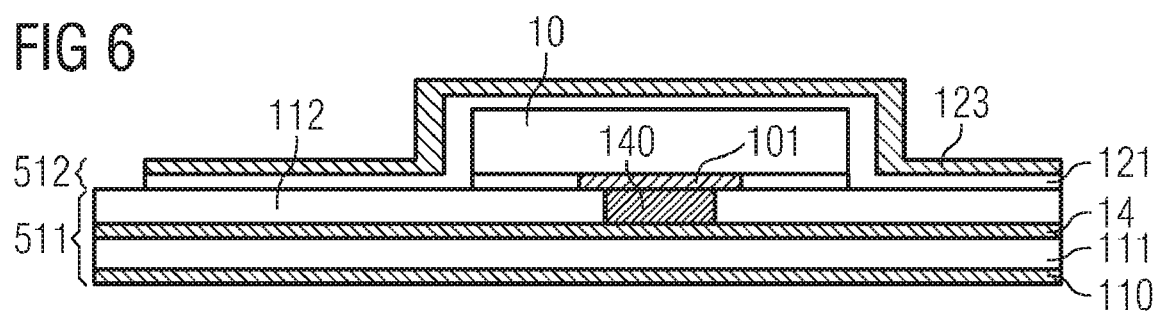

SENSOR ARRANGEMENT

This application is a continuation of co-pending International Application No. PCT/DE2007/000899, filed May 15, 2007, which designated the United States and was not published in English, and which claims priority to German Application No. 10 2006 025 179.2 filed May 30, 2006, both of which applications are incorporated herein by reference.

BACKGROUND

A temperature sensor is known from the publications DE 103 58 778 A1 and German patent publication DE 102004047725 A1 and corresponding U.S. patent application publication 2008/056331.

SUMMARY

In one aspect, the present invention specifies a sensor arrangement that permits a precise temperature measurement on a tube. In one embodiment, a sensor arrangement suitable for temperature measurement is specified, with a measurement head, the operating principle of which is based on the temperature-dependent resistance of the thermistor.

In a particular embodiment, a sensor is specified, with a bracket-like holder, on the interior of which a flat measurement head is arranged.

The measurement head is preferably fixed to the inner surface of the holder. A section of the tube to which the measurement head is thermally coupled is arranged in the interior of the holder. The holder surrounds the tube section.

The measurement head includes a sensing element (sensor) for detecting the temperature of the tube. The measurement head is thermally coupled to at least one part of the tube circumference. The measurement head further includes a composite of two flexible plastic films, as well as preferably metallic conductor traces between which the sensing element can be contacted, and which are arranged at least in part between the two plastic films in an advantageous variant. The conductor traces can also be integrated in an inner layer of one of the plastic films, however.

The specified sensor ensures a good coupling to the tube over a relatively large surface. Because the conductor traces at least partially surround the tube, the temperature averaging in the circumferential direction of the tube can be performed via the conductor traces.

A flexible, i.e., bendable, measurement head has the advantage of being easily adaptable to the circumference of the tube.

The measurement head has a two-dimensional connection to the surface to be measured. In one variant, the measurement head contacts at least 20% of the tube's circumference. In another variant, the measurement head contacts at least 30% of the tube's circumference. In an additional variant, the measurement head contacts at least 50% of the tube's circumference. It is particularly advantageous if the angle of wrap of the measurement head around the tube is at least 270°.

Medium preferably flows through the interior of the tube. For example, a liquid or a gas can flow through the tube.

The sensor arrangement preferably includes a holder to be mounted on the tube. The measurement head is arranged between the holder and the tube and is pressed or adhered to the tube by the holder.

The holder preferably has resilient properties. It is preferably flexible, at least in part.

The holder preferably has projections that contact the measurement head. The projections are preferably small and run in the longitudinal direction of the tube. The projections can also run in the circumferential direction, however. The projections can also form a network-like structure. The areas of the projections lying outside the holder are spaced away from the measurement head, so that an air gap is arranged between them and the measurement head.

The holder can preferably be folded around the tube. The holder preferably has mutually complementary catch elements that prevent the holder from folding open. For example, the holder can have a compressible bulge that acts like a hinge device. The bulge is preferably turned outwards, or away from the tube; it can be advantageous to construct the wall thinner, in one area at least than in the other areas of the holder.

The holder can be conceived as a housing for the measurement head. For example, the holder can have the shape of a disk having any desired cross section, with a hollow interior through which the tube is guided. A cavity in which the measurement head is situated is arranged between the holder and the tube. In order to seal off the cavity, a seal, e.g., one rubber ring per end face, is preferably formed between the end-face wall of the holder and the tube.

Above all, the holder ensures the fixation of the measurement head on the tube and protects the measurement head from mechanical effects, among other things. A holder embodied as a housing has the advantage that the measurement head is protected from thermal influences of the environment that are harmful to the measurement head.

Connecting lines for contacting the sensing element are run through the holder. The connection lines can include cables, for instance, that are electrically connected to the conductor traces of the measurement head. The connection point can be arranged in the cavity.

A plug connector, to which the conductor traces inaccessible from the outside are soldered, on the one hand, and to which connection lines accessible from the outside can be connected, on the other, can alternatively be integrated into the wall of the holder.

The material of the conductor traces preferably also has high thermal conductivity.

The holder can include at least one layer of a thermally insulating material. Porous materials such as foamed materials are particularly suitable as thermally insulating materials. Other materials commonly used for thermal insulation can also be considered. Alternatively, a material with thermally insulating properties can be arranged in the cavities that are formed between the holder and the tube. It is also possible to wind a thermal insulation material having the above-mentioned properties around the sensor arrangement in order to improve the heat decoupling from the environment.

The sensing element is based on a resistor that is variable as a function of temperature. It can be, e.g., an NTC or a PTC element, where PTC stands for Positive Temperature Coefficient and NTC for Negative Temperature Coefficient. The resistance of an NTC element decreases with increasing temperature, and that of a PTC element increases with temperature. A PTC element can be produced from any desired conductive or semiconductive material. An NTC element preferably includes a ceramic material with NTC properties.

The at least one sensing element can include several sensing elements connected in series. The sensing element can also include sensing elements, contactable independently of one another, with two conductor traces per sensing element.

In one variant, the conductor traces can be configured as metal coatings (preferably copper coatings) of the plastic films. However, they can also be flexible metal films that are enclosed together with the sensing element between the two films.

BRIEF DESCRIPTION OF THE DRAWINGS

Embodiments of a sensor arrangement and the flexible measurement head will be explained below with reference to schematic figures not drawn to scale. In the figures:

FIG. 1 shows a sensor arrangement with a flexible measurement head and a foldable holder, in cross section transverse to the tube;

FIG. 2 shows the sensor arrangement according to FIG. 1, in a longitudinal section;

FIG. 3A shows the schematic structure of the flexible measurement head before encapsulation of the sensing element;

FIG. 3B shows the schematic structure of the flexible measurement head after encapsulation of the sensing element;

FIG. 4 shows a cross section of a sensor arrangement in which the first and second film have several layers;

FIG. 5 shows a plan view of the sensor arrangement according to FIG. 4; and

FIG. 6 shows a cross section of an additional sensor arrangement with conductor traces arranged in the first film and protective sublayers.

The following list of reference numbers can be used in conjunction with the figures:

1 Measurement head
10 Sensing element
101, 102 Contacts of the sensing element
103 Thermistor layer
11, 12 Plastic films
14, 15 Conductor traces
2 Tube
3 Air gap
4 Holder
41 Projections of the holder
5 Line lead-through
6 Hinge device
7 Seal
101, 102 Electrical terminals of sensing element 10
110 Shielding sublayer of film 11
111, 112 Dielectric sublayer of film 11
115 Adhesive layer
121 Dielectric sublayer of film 12
123 Shielding sublayer of film 12
124 Adhesive layer
140 Plated through-hole
511 First film composite
512 Second film composite

DETAILED DESCRIPTION

FIG. 1 shows an exemplary sensor arrangement comprising a tube 2 with a fluid and a flexible measurement head 1 wound around the tube and illustrated in detail in FIGS. 3A and 3B. Measurement head 1 is arranged between the tube 2 and a holder 4. Measurement head 1 is coupled to tube 2 in a relatively large-area coupling area.

Holder 4 can be constructed in one piece, e.g., like a clamp. Holder 4 is preferably foldable. For this purpose, a hinge device 6 is provided that connects parts 4a, 4b of holder 4 to one another. The hinge device 6 shown in FIG. 1 represents a bulge of the outer surface of holder 4. This hinge device is thus formed in one piece, with parts 4a, 4b of holder 4 foldable with respect to one another.

The parts of holder 4 can also be constructed as half-shells that can be separated from one another and that can be snapped together.

A line lead-through 5, preferably in the form of a plug connection is preferably formed in the outer surface of the holder. Electrical supply lines that comprise conductor traces 14, 15 (FIGS. 3A and 3B) are run through lead-through 5. In alternate embodiments, the electrical supply lines are soldered or welded to conductor traces 14, 15. Conductor traces 14, 15 can be flat wires, for instance.

Holder 4 has several projections 41 turned toward the tube that are distributed with spaces between them around the circumference of the tube. A closed cavity or air gap 3 is preferably formed between measurement head 1, two successive projections and the essentially cylindrical outer surface of holder 4 in this variant. Several cavities or air gaps 3 are arranged between measurement head 1 and holder 4. Such cavities can be filled at least in part with a thermally insulating material such as foamed material.

It can be seen in FIG. 2 that a seal 7 is arranged between the two walls on the end face of holder 4 and tube 2. The seal 7 is preferably a rubber ring.

The measurement head 1 shown in FIGS. 3A, 3B comprises a sensing element 10, two plastic films 11, 12 and conductor traces 14, 15 for contacting sensing element 10. Sensing element 10 comprises contacts 101, 102 and a thermistor layer 103 arranged between them (FIG. 3B).

A variant in which conductor traces 14, 15 are fixed to the surface of these films before these films 11, 12 are connected is presented in FIG. 3A. Alternatively, they can first be fixed to sensing element 10 and then be welded together with it between films 11, 12.

FIG. 3B shows a sensing element 10 welded between films 11, 12 in a cross section perpendicular to the longitudinal direction of measurement head 1.

In case of several sensing elements 10, they are preferably distributed one after the other in the circumferential direction.

The design of the measurement head, and the wiring of sensing element 10 in particular, can in principle be of any desired type. FIGS. 4, 5 and 6 show a sensing element 10 with SMD (surface mounted device) contacts that are arranged on a main surface, such as the underside of the sensing element. In this case, conductor traces 14, 15 connected to the SMD contacts of the sensing element are arranged in a common layer.

The plastic films 11, 12 mentioned in connection with FIGS. 3A, 3B can be replaced with the film composites 511, 512 explained below.

FIGS. 4, 5 show different views of a sensor arrangement having a first film composite 511, a metal layer with conductor traces 14, 15 arranged thereon and a sensing element 10 with surface-mountable terminals 101, 102 arranged on its underside. A second film composite 512, which also contacts the side faces of the sensing element and seals tightly to the upper side of first film composite 511, is laminated on the backside of sensing elements 10. Second film composite 512 also covers the conductor traces 14, 15 electrically connected to sensing element 10.

First film composite 511 further comprises a dielectric layer, e.g., sublayer 111 in FIG. 4, and is, for example, a Cu-coated polyimide film, wherein the etched copper layer is connected to the polyimide film by means of, for instance, an adhesive layer 115 illustrated in FIG. 4. Sublayers 111, 115 and conductor traces 14, 15 together form a flexible composite. In one variant, adhesive layer 115 can be dispensed with.

Second film composite 512 comprises a dielectric layer, e.g., sublayer 122 in FIG. 4. An adhesive layer 124 that guarantees the adhesion between sublayer 122 and the upper side of first film composite 511, or the surface of sensing element 10 facing second film composite 512, is arranged on the underside of sublayer 122. Sublayers 122, 124 together form a flexible composite.

In FIG. 4, the structured metal layer with the conductor traces 14, 15 is on the upper side of first film composite 511. A variant in which the structured metal layer is arranged between two dielectric sublayers 111 and 112 is presented FIG. 6. Thus, electrical supply lines 14, 15 leading to the sensing element are concealed in the interior of first film composite 511. The concealed conductor traces 14, 15 can be contacted from the exterior via vertical electrical connections, plated through-holes 140. Plated through-holes 140 are fixedly connected to external terminals 101, 102 of sensing element 10.

In the variant shown in FIG. 6, the uppermost, or outward-facing, sublayer of second film composite 512 is formed by an electromagnetically shielding sublayer 123, for example, a copper layer. The lowermost, or outward-facing, side of first film composite 511 is formed by an electromagnetically shielding sublayer 110, for example, a copper layer.

A plan view of the sensor arrangement shown in FIG. 4 or 6 can be seen in FIG. 5. The concealed conductor traces 14, 15, as well as external terminals 101, 102 of sensing element 10, are represented by dashed lines.

The embodiment of the sensor arrangement is not limited to the above-explained technical features or to the shape and spatial arrangement of elements of the sensor arrangement. The soldering can be replaced with a welded connection or a plug connection, and vice versa. Plug-connected solutions for realization of electrical supply lines comprise standardized mating plugs.

What is claimed is:

1. A sensor arrangement comprising:
    a tube;
    a bracket-like holder surrounding the tube; and
    a flat measurement head arranged in an interior of the bracket-like holder, the flat measurement head being flexible such that the flat measurement head can be wound around at least part of a circumference of the tube, wherein the flat measurement head is arranged between the holder and the tube and is pressed by the holder onto the tube.

2. The sensor arrangement according to claim 1, wherein the holder has projections that contact the flat measurement head, and wherein areas of the holder between the projections are spaced away from the flat measurement head.

3. The sensor arrangement according to claim 1, wherein the holder is folded around the tube.

4. The sensor arrangement according to claim 1, wherein the holder has a compressible bulge provided as a hinge.

5. The sensor arrangement according to claim 1, wherein a cavity is arranged between the holder and the tube, the flat measurement head being arranged in the cavity, the sensor arrangement further comprising a seal arranged between the holder and the tube for sealing off the cavity.

6. The sensor arrangement according to claim 1, wherein the holder comprises a layer of thermally insulating material.

7. The sensor arrangement according to claim 1, wherein the holder comprises at least one layer of a porous material.

8. The sensor arrangement according to claim 1,
    wherein the bracket-like holder surrounds the tube and the flat measurement head is wound around at least part of the circumference of the tube,
    wherein the flat measurement head comprises a composite of at least two flexible plastic films and a sensing element arranged between the flexible plastic films, the sensing element provided for detecting a temperature of the tube,
    wherein the flat measurement head comprises metallic conductor traces via which the sensing element can be contacted, the conductor traces being arranged at least in part between the plastic films, and
    wherein the flat measurement head contacts at least one part of a surface of the tube two-dimensionally.

9. The sensor arrangement according to claim 8, wherein the flat measurement head contacts at least 20% of the circumference of the tube.

10. The sensor arrangement according to claim 8, wherein the flat measurement head contacts at least 50% of the circumference of the tube.

11. The sensor arrangement according to claim 8, wherein the flat measurement head is fixed by adhesion to the tube.

12. A sensor arrangement comprising:
    a tube;
    a measurement head adhered to the tube and contacting a circumference of the tube, the measurement head comprising a composite of at least two flexible plastic films and a sensing element arranged between the plastic films, the sensing element being electrically contacted via metallic conductor traces; and
    a holder surrounding the tube, wherein the measurement head is arranged between the holder and the tube and is pressed by the holder onto the tube.

13. The sensor arrangement according to claim 12, wherein the metallic conductor traces are arranged at least in part between the plastic films.

14. The sensor arrangement according to claim 12, wherein the measurement head contacts at least 50% of the circumference of the tube.

15. The sensor arrangement according to claim 12, wherein the holder has projections that contact the measurement head, and wherein areas of the holder between the projections are spaced away from the measurement head.

16. The sensor arrangement according to claim 12, wherein the holder comprises a layer of thermally insulating material.

17. The sensor arrangement according to claim 12, wherein a cavity is arranged between the holder and the tube, the measurement head being arranged in the cavity.

18. The sensor arrangement according to claim 17, further comprising a seal arranged between the holder and the tube for sealing off the cavity.

19. A sensor arrangement comprising:
    a tube;
    a measurement head contacting a circumference of the tube, the measurement head comprising a composite of at least two flexible plastic films and a sensing element arranged between the plastic films, the sensing element being electrically contacted via metallic conductor traces;
    a holder surrounding the tube, wherein the measurement head is arranged between the holder and the tube and is pressed by the holder onto the tube; and
    a seal, wherein a cavity is arranged between the holder and the tube and the measurement head is arranged in the cavity, the seal being arranged between the holder and the tube for sealing off the cavity.

* * * * *